United States Patent
Tamargo Garcia

(10) Patent No.: US 9,463,986 B2
(45) Date of Patent: Oct. 11, 2016

(54) HYDROMETALLURGICAL METHOD FOR RECOVERY OF ZINC IN SULPHURIC MEDIUM STARTING FROM SULPHIDIC ZINC CONCENTRATES WITH HIGH IRON CONTENT

(75) Inventor: Francisco Jose Tamargo Garcia, Madrid (ES)

(73) Assignee: TAM 5, S.L., Madrid (ES)

(*) Notice: Subject to any disclaimer, the term of this patent is extended or adjusted under 35 U.S.C. 154(b) by 0 days.

(21) Appl. No.: 14/116,329

(22) PCT Filed: Jul. 16, 2012

(86) PCT No.: PCT/ES2012/070535
§ 371 (c)(1),
(2), (4) Date: Nov. 7, 2013

(87) PCT Pub. No.: WO2014/013092
PCT Pub. Date: Jan. 23, 2014

(65) Prior Publication Data
US 2014/0212348 A1    Jul. 31, 2014

(51) Int. Cl.
*C22B 3/08* (2006.01)
*C01G 9/02* (2006.01)
*C22B 19/02* (2006.01)
*C22B 3/00* (2006.01)

(52) U.S. Cl.
CPC .............. *C01G 9/02* (2013.01); *C22B 19/02* (2013.01); *C22B 19/22* (2013.01); *C22B 19/26* (2013.01); *Y02P 10/234* (2015.11)

(58) Field of Classification Search
None
See application file for complete search history.

(56) References Cited

U.S. PATENT DOCUMENTS

| 4,305,914 A | 12/1981 | Pammenter et al. |
| 5,120,353 A | 6/1992 | Fugleberg et al. |
| 6,475,450 B1 | 11/2002 | Saruta et al. |

FOREIGN PATENT DOCUMENTS

| CA | 873262 | 6/1971 |
| CA | 1094819 | 2/1981 |
| ES | 385575 | 11/1971 |
| ES | 407811 | 6/1973 |
| NO | 123248 | 10/1971 |
| WO | WO 02/46481 | 6/2002 |
| WO | PCT ES 2011/070265 | 4/2011 |

*Primary Examiner* — Melissa Swain
(74) *Attorney, Agent, or Firm* — Intellectual Property Law Group LLP

(57) ABSTRACT

This method is based in the recirculation of an iron free solution or a solution with low iron content in such a manner that the final acidity conditions obtained are ideal for iron to efficiently precipitate as jarosite.

12 Claims, 4 Drawing Sheets

HYDROMETALLURGICAL METHOD FOR RECOVERY OF ZINC IN SULPHURIC MEDIUM STARTING FROM SULPHIDIC ZINC CONCENTRATES WITH HIGH IRON CONTENT

CROSS-REFERENCE TO RELATED APPLICATIONS

This application is a U.S. National Phase application, under 35 U.S.C. §371, of International Application no. PCT/ES2012/070535, with an international filing date of Jul. 16, 2012, which is hereby incorporated by reference for all purposes.

FIELD OF INVENTION

The present invention describes a hydrometallurgical method for the recovery of zinc and other valuable metals characterized by having a high extraction rate and generating clean residues during the production of electrolytic zinc from sulphidic zinc concentrates. This method is particularly suitable for treating different kinds of zinc concentrates, particularly those with high iron content, and is very well adapted to those manufacturing plants that use processes known as jarosite, goethite or direct leaching processes, improving the results, both in terms of the efficiency of metal recovery, and of the quality of the residue generated.

BACKGROUND OF THE INVENTION

In order to obtain zinc metal from its raw materials, mainly zinc sulphide concentrates, both the pyrometallurgical and the hydrometallurgical routes have been used, although the first of these is clearly coming into disuse due to the high operating costs and the environmental problems associated to this process. Hydrometallurgical processes mostly follow the RLE line (Roasting, Leaching, Electrowinning), although some plants, very few, avoid roasting the concentrates, either because they carry out the direct leaching of concentrate process under pressure in autoclaves, or at atmospheric pressure.

Until the mid '60s, electrolytic zinc plants used a neutral leaching stage and a weak acid leaching stage in the leaching area. This method allowed them to extract the zinc contained in oxide form in the calcine, the product resulting from roasting, while the zinc combined with the iron in the form of zinc ferrites was not leached. This process yielded zinc recovery rates of between 85 and 90%, leaving behind a residue in which the zinc ferrites were concentrated, with a zinc content of 17-20%.

In 1965 the process known as jarosite process began to be used at the industrial level, as described in documents ES 34601, ES 385575 and NO 108047. Implementing this process was an important step towards successfully increasing the recovery rate of zinc above 90% levels. In addition to neutral leaching, the process also entails two or more stages of acid leaching where solubilizing the zinc and iron contained in zinc ferrites produces zinc sulphate ($ZnSO_4$) and ferric sulphate ($Fe_2(SO_4)_3$), while allowing at the same time to separate a residue containing the lead and silver present in the calcine. Afterwards, this solution containing $Fe^{+++}$ in sulphate form and having the residual acidity necessary for keeping the $Fe^{+++}$ in solution, is treated with calcine in the presence of a cation such as $Na^+$, $K^+$ or $NH_4^+$ under certain conditions required to partially lower the acidity and facilitating the iron to precipitate as jarosite, a basic sulphate having the formula $Me(SO_4)_2Fe_3(OH)_6$, where Me can be one of the cations mentioned above. Later on, incorporating a jarosite acid washing stage made possible to increase the recovery rate up to 97%. This process is efficient and its operating cost is very competitive.

A variation on the jarosite process is what is known as the conversion process described in document CA 1094819. This process differs from the process described above in that both the leaching of ferrites and the precipitation of iron as jarosite take place simultaneously, although in this process it is not possible to separate the lead-silver residue, obtaining at the end a single residue containing all the iron in the form of jarosite as well as the lead, silver and silica contained in the calcine.

Another variation of the jarosite process is described in document U.S. Pat. No. 4,305,914 of Dec. 15, 1981. It is a procedure in which the solution obtained from the acid leaching stage containing the $Fe^{+++}$ in solution is cooled, and after the acidity present has been later partially neutralized, the solution is reheated again to precipitate the jarosite in the presence of a cation such as $Na^+$, $K^+$ or $NH_4^+$, after having diluting it with a zinc sulphate solution in order to prevent the acidity generated by precipitating the iron present as jarosite to be so high that it prevents the precipitation process. This sequence eliminates the need to neutralize with calcine, obtaining a jarosite residue with low heavy metal content. Nevertheless, this process is not cost effective and therefore has never been developed at the industrial level.

Another process developed several years after the jarosite process, known as the goethite process, is described in document CA 873262. As in the case of the jarosite process, this process entails a neutral leaching stage and one or more stages of acid leaching working in counter-current, and where the ferrites are leached while at the same time is possible to separate the lead-silver residue. The solution resulting from the acid leaching is treated with zinc concentrate in order to reduce the ferric iron ($Fe^{+++}$) to ferrous iron ($Fe^{++}$). This is followed by a pre-neutralization stage, where part of the existing acidity is neutralized with calcine, and a subsequent iron oxidation and precipitation stage that results in goethite (FeO(OH)), in which calcine is also used to neutralize the acidity generated in the formation of goethite and oxygen is used for oxidizing $Fe^{++}$ to $Fe^{+++}$. This process produces a residue that is somewhat richer in iron, between 30 and 40%, compared to the percentage obtained with the jarosite process, in which the iron content of the residue obtained is usually between 28 and 32%. However, the zinc recovery rate of this process is lower than the one obtained with the jarosite process. While the usual final zinc content found in the residue resulting from the jarosite process is usually of 3-4% of zinc, the final residue resulting from the goethite process contains up to 8-10% of zinc.

A variation of the goethite process using paragoethite yields results similar to those described above.

Nowadays there are a certain number of electrolytic zinc plants combining the traditional (RLE) process with direct leaching of concentrates. It is usual in these plants to generate a final residue containing the iron (in most cases in the form of jarosite) and also the lead, silver and silica contained in the treated raw materials in addition to the elemental sulphur generated during the direct leaching process.

The main drawbacks of these processes can be summarized below:

Zinc recovery rates, though acceptable, in the best of cases does not exceed 97%, while in the majority of plants using these processes the overall recovery ranges between 94 and 96.5%.

The percentage of lead and silver recovered with the lead-silver residue does not generally exceed 60-70% of the total of these metals contained in the calcine; in many of those plants the recovery rate for these metals is frequently around 50%. The remaining content is lost together with the iron residue, thereby contaminating it.

The recovery rate for copper does not exceed 80%, since the iron residue contains appreciable quantities of this metal.

The amount of impurities accompanying the iron residue, jarosite, goethite or paragoethite (zinc and lead as already mentioned, as well as arsenic and/or copper when zinc concentrates are treated with appreciable contents of these elements) means that the residue cannot be used for any other process and has to be stored in safety ponds, becoming a major environmental liability. In the case of jarosite, environmental regulations do not allow it to be stored in the form it is generated by the zinc manufacturing process, and therefore it has to be first rendered inert by mixing it with lime and cement (jarofix process), before it can be stored in safety ponds.

Currently, certain countries have already banned the practice of storing this kind of residue (Netherlands, Japan, Australia), while another group of countries allow it to be stored in existing ponds but no longer permit the construction of new storage ponds (France, Belgium, Germany). This situation is becoming more restrictive as environmental pressure grows, demanding cleaner and more efficient technologies for the electrolytic zinc production.

Consequently, any novel technology intended to be applied in this field would have to enable maximum metal recovery rates at a competitive cost and generate only environmentally acceptable residues that can be in turn used favorably in other industrial processes, eliminating the need for permanent storage—a solution, as noted above, that is no longer permitted in some countries, and which will be, presumably, also banned, in other countries in a not so distant future—. In this regard, during the last 30 years intensive research work has been conducted in the field of zinc production searching for a manageable and economically competitive process which has a high metal recovery rate, although to date, no satisfactory solution has been found. One of the many examples regarding these works that can be cited is described in document U.S. Pat. No. 4,305,914. The process it describes attempts to obtain a jarosite precipitate with low non-ferrous metals content to make the jarosite more easily marketed.

Document WO 02/46481 A1 describes a procedure that appears to meet the requirements mentioned above, since it does not require a neutralizing agent for the iron to be precipitated as jarosite. This procedure follows the goethite process line, because in addition to neutral leaching it entails one or several stages of acid leaching followed by a reduction stage where the Fe+++ is reduced to Fe++ in the presence of the zinc concentrate, and a neutralizing stage during which calcine is used to neutralize partially or totally the acidity present in the solution. Finally, instead of continuing with the process that will result in the precipitating of iron as goethite, the jarosite is precipitated by means of injecting oxygen in the presence of sodium, potassium or ammonium ions, as well as a significant recirculation of jarosite solids under temperature conditions close to the boiling point of the solution. However, this procedure presents a series of difficulties that are probably the reason why it has not been possible to apply it to industrial processes. Indeed, it is clear that the working acidity during the jarosite stage depends on the amount of iron precipitated as jarosite, and therefore, the larger the iron concentration at the beginning of this stage, the more iron is precipitated, and subsequently, the greater the final acidity at which the iron is precipitated. In order to achieve an acceptable iron precipitation percentage working with high acidity levels it is necessary, on the one hand, to raise the working temperature to values close to the boiling point. This entails an unacceptable risk for people and facilities, unless autoclaves are used. On the other hand, as shown on the example provided in that same document, it is necessary to recycle the jarosite seed (although the document does not mention this must be done by recycling the underflow from the jarosite thickener) in significant amounts, which makes it necessary at this stage to also increase, significantly, the flow and the percentage of solids (according to the example shown in said document the circulating flow has to be increased during this stage by more than 100% with a high content of suspended solids). The consequences derived from the required operating conditions are high steam consumption, increasing the volume of the necessary equipment, and a considerable increase in the consumption of flocculant.

Proof of the lack of success achieved to date is that today none of these processes that attempted to improve the quality of the iron residue is being used and this residue continues to be stored in safety ponds, with the exception of a plant that generates hematite and those which use pyrometallurgical processes for treating the residues.

Patent Application PCT ES 2011/070265 describes a procedure similar to that described in document WO 02/46481 A1. The fundamental difference contributed by the process described in this document is that the maximum working acidity is limited, thereby limiting the admissible iron content of the initial solution and using non-polluting neutralizing agents according to the availability of those materials at the plant. This allows the jarosite precipitation stage to take place at lower acidities and temperatures without the need to recycle any jarosite seed. This procedure works well and is suitable for those plants that operate with zinc concentrates having low iron content (up to 5 of 6%), but it is not appropriate for treating zinc concentrates with high iron contents, since the procedure itself limits the maximum iron content in the solution that is treated during the iron oxidation and jarosite precipitation stage. This is relevant at this point in time, when the trend is to treat zinc concentrates with ever higher impurity rates, iron being the most abundant. Today, it is very usual to find zinc concentrates in the market containing between 8 to 12 percent of iron. In the daily practice this translates into the following: a plant working with zinc concentrates with an average 5% iron content generates a solution from the acid leaching stage containing between 18 to 20 g/l of iron. If they were to work with zinc concentrates containing an average of 9% iron content the iron content after the acid leaching stage would be 30 to 32 g/l. While in the first case the procedure described in document PCT ES 2011/070265 could be applied without any problem, in the second case applying that procedure would generate an excessively high acidity during the jarosite stage that would prevent the iron from precipitating efficiently, leaving a considerable amount of iron in the final solution. This would require a high amount of iron recirculating through all the leaching stages, as indicated later in the present document, unless the neutralizing agent would be used in quantities that are not usually available at production plants, which would also generate additional costs and the additional problem derived from using BZS as neutralizing agent, as it dilutes jarosite residue (therefore increasing its volume), a situation which is not recommended on economic grounds. It is for this reason that the procedure described limits the iron content in the solution resulting from the acid leaching stage to 25 g/l maximum. This condition, according to the procedure described, is only attained by limiting the iron content of the zinc concentrates treated, which entails an inconvenience for a good part of the zinc producers that would see their capacity for treating the concentrates available in the market limited by this condition.

As it is known in the industry, the plants working with the RLE system—the system more often used today—generate steam during the roasting process. This steam is later used to heat the solutions that are processed during some of the leaching and purification stages. The most important points of consumption for those plants that use the jarosite process are the acid leaching, jarosite precipitation and hot purification stages. It is important for the economic considerations of the process to manage judiciously the available steam because if more was needed the cost of generating would substantially increase the operational costs. Therefore, excessive flows and/or temperatures are to be avoided during the different leaching stages so the plant can be self-sufficient by using the steam generated during the roasting process.

It is well known in the art that precipitating iron as jarosite under atmospheric pressure conditions is an incomplete process because always a portion of the iron remains unprecipitated. In addition it should be taken into account the $Fe^{++}$ present, which does not precipitate unless it is oxidized to $Fe^{+++}$, In fact, on the one hand the oxidation of $Fe^{++}$ to $Fe^{+++}$, in acid medium is incomplete, so the non-oxidized portion of $Fe^{++}$ remains in solution because jarosite is only formed from $Fe^{+++}$, while on the other hand the $Fe^{+++}$ present in the solution precipitates partially as jarosite depending on certain operational parameters such as acidity, temperature, residence time and the concentration of $Na^+$, $K^+$ or $NH_4^+$ ions used to form the jarosite. The presence of jarosite seed, recycling the underflow of the jarosite thickener may also affect the percentage of precipitated $Fe^{+++}$ as claimed in patent document WO 02/46481 A1. The iron that does not precipitate as jarosite moves to the neutral leaching stage, returning again through all the stages of the leaching process until finally arriving to the iron oxidation and jarosite precipitation stage. The consequence of this behavior is a flow increase in all stages that will be larger the more the iron recirculates. This may affect the stability of the process as a whole, because first, during the acid leaching and jarosite precipitation stages steam is consumed to heat the solutions, and the larger the flow of these stages the larger the amount of steam needed. Currently there are some electrolytic zinc plants using the jarosite process that are encountering difficulties to maintain the stability of the leaching plant because they operate in such a manner that the iron recycled in the process is in the order of 50%. Therefore an objective of any process where iron is precipitated as jarosite must be that the precipitation be as complete as possible in order to minimize excessive iron recirculation.

Consequently, an objective of the present invention is to provide a hydrometallurgical method for recovering zinc in sulphuric media from sulphidic zinc concentrates having a high iron content that it will make possible to attain high rates of metal recovery.

Another objective of the present invention is to provide a hydrometallurgical method for recovering zinc in sulphuric media from sulphidic zinc concentrates having a high iron content in which an environmentally acceptable iron residue is obtained that can be used in other industrial processes, avoiding thus having to store it in safety ponds.

Another objective of the present invention is to provide a hydrometallurgical method for recovering zinc in sulphuric media from sulphidic zinc concentrates having a high iron content that manages efficiently the energy resources generated during the roasting process done at the electrolytic zinc plant to minimize operational costs.

Another objective of the present invention is to provide a hydrometallurgical method for recovering zinc in sulphuric media from sulphidic zinc concentrates having a high iron content that is capable of reducing iron recirculation through the various leaching stages to provide a stable and efficient operation at the electrolytic zinc plant.

SUMMARY OF THE INVENTION

The present invention meets the aforementioned requirements to be a novel technology intending to displace the existing ones by providing a method characterized by: competitive cost, high metal recovery rate, generating clean residues that can be reused in other industrial processes, managing efficiently the energy resources available at the plant (and generated by the process itself) and low iron recirculation through the leaching stages.

The process is based on $Fe^{+++}$ first being reduced to $Fe^{++}$ in the solution resulting from the acid leaching stage, to be later oxidized back into $Fe^{+++}$ after the acidity in the solution has been neutralized with calcine, before it precipitates as jarosite at a moderate temperature, while at the same time the iron content in the solution is adjusted, before oxidizing it and precipitating it as jarosite, by diluting it with a zinc sulphate solution, so during the iron oxidation and jarosite precipitation stage the working acidity can be sufficiently low for the iron to precipitate as jarosite in an efficient manner, and thus prevent excessive iron recirculation through the leaching stages, as this could alter the nature and proper operation of said stages, particularly the acid leaching stage(s) during which a high volume of steam is consumed. This procedure makes possible, on the one hand, to neutralize the acidity accompanying the Fe in the solution before proceeding to the jarosite stage, separating the solids generated during the neutralization so they can be recycled to the acid leaching stage, and on the other hand during the actual stage of iron oxidation and jarosite precipitation a neutralizing element, oxygen, is added. When the oxygen oxidizes $Fe^{++}$ to $Fe^{+++}$ it consumes a sufficient quantity of the acid generated during the precipitation of jarosite that allows the jarosite stage to work under conditions of acceptable acidity, effectively lowering iron recycling to around 10-20%. This considerably improves the performance of the remaining stages taking place at the leaching plant. At the same time, working under low acidity conditions during the iron oxidation and jarosite precipitation stage enables the process to work perfectly at temperatures lower than those normally required, so in most cases the temperature at which the solution enters this stage (usually between 80 and 90° C.) is sufficient to drive the reaction, eliminating the need to consume steam to raise the temperature.

The present invention describes a hydrometallurgical method for recovering zinc in sulphuric media from sulphidic zinc concentrates with high iron content that, in the most general scenario, comprises the following stages:
a. Roasting, where the sulphides are converted into oxides
b. Neutral leaching where the zinc oxide (calcine) is dissolved in sulphuric acid in the form of spent electrolyte in order to obtain a zinc sulphate solution which is then sent to the purification stage
c. An acid leaching stage where the zinc ferrites are leached by means of sulphuric acid in the form of spent electrolyte and concentrated sulphuric acid, generating a residue containing the lead, silver and gold present in the concentrates and also a solution rich in zinc sulphate and ferric sulphate.
d. Adjusting the iron content of the solution resulting from stage (c) by recirculating the solids-free zinc sulphate solution resulting from stage (f) and reducing the $Fe^{+++}$ contained in the solution to $Fe^{++}$ by adding zinc concentrate, where the residue containing elemental sulphur formed according to reaction (5) and the zinc sulphide that has not reacted, is recycled through the roaster, while the solution containing mainly zinc sulphate and ferrous sulphate goes to stage (e).
e. Neutralizing with calcine the acidity in the solution resulting from the stage where $Fe^{+++}$ is reduced to $Fe^{++}$.
f. Oxidizing the iron and precipitating the jarosite from the solution free of contaminating solids that has resulted from stage (e) by injecting oxygen or oxygen-enriched air and adding $Na^+$, $K^+$ or $NH_4^+$ cations in alkali form, or a salt from either of those cations, at a temperature between 80 degrees centigrade and the boiling point of the solution but preferably between 80 and 90 degrees centigrade.

When treating concentrates containing high levels of arsenic and copper specific stages can be added to the process after neutralizing stage (e) to separate these elements that otherwise would accumulate in the circuit and prevent or greatly difficult the process.

Of all the parameters mentioned above that influence the jarosite precipitation process, acidity has the most decisive influence, provided all other parameters are maintained within operational ranges, so the greater the final acidity the greater the amount of iron that has to be recycled. Conversely, the lower the working acidity the greater the efficiency at which iron will precipitate into jarosite. Experience demonstrates that when acidity is kept below 10 g/l the process during which $Fe^{+++}$ precipitates as jarosite is sufficiently complete as to not cause problems in the remaining leaching stages. This final acidity level can be attained by treating a solution containing 15 g/l of $Fe^{++}$ at moderate temperatures (between 80 and 90° C.) without having to add any neutralizing agent other than the oxygen used for oxidizing Fe++ to Fe+++ during the actual jarosite stage, obtaining a clean jarosite residue free of impurities that could prevent it from being used later in other processes and therefore avoiding the need for storing it in safety ponds. Evidently, the required amount of either $Na^+$ or $NH_4^+$ ions can be added to the process in the form of a neutralizing agent like NaOH, $Na_2CO_3$ or $NH_3$. This would render the working conditions excellent for obtaining the best results for iron precipitation in the jarosite stage. It is also evident that the iron precipitation process is favored at a higher temperature, around 95° C., but in this particular case it would only be applied when the plant had a surplus of steam.

The innovative procedure described in the present document makes it possible to obtain optimum $Fe^{++}$ concentration at the beginning of the iron oxidation and jarosite precipitation stage (f) because the recirculating solution is free of iron or has a low iron content, making the final acidity conditions reached at the end of this stage ideal for efficient iron precipitation, eliminating the need for unnecessarily having to recycle the iron through the entire leaching process. Solution recirculation can be carried out in different manners as follows:

1. Recycling the zinc sulphate solution resulting from stage (b), neutral leaching, to the iron oxidation and jarosite precipitation stage (f). This is the least preferred option, since, in addition to the iron that did not precipitate during the jarosite stage—corresponding to the nominal flow generated during acid leaching stage—recirculating to the remaining leaching stages, the non-precipitated iron contained in the overflow recycled during this stage is also recirculated.
2. Recycling zinc sulphate solution with low iron content from stage (f) to stage (e), the calcine neutralization stage. This is an acceptable option, although the iron present as $Fe^{+++}$ in the excess flow that is recycled through the jarosite stage is also recirculated.
3. Recycling zinc sulphate solution with low iron content from stage (f) to stage (d), the $Fe^{+++}$ reduction stage. This is the preferred option, because recycling the solution does not entail increasing iron recirculation through the neutral leaching and acid leaching stages.
4. Recycling zinc sulphate solution with low iron content from stage (f), after having separated the solids present, to the same stage (f) where Fe++ is oxidized into Fe+++ and the jarosite is precipitated. This is a less preferred option, because although there is no additional iron recycling through stages other than stage (f), the flow resulting from recycling the solution has to be very large to maintain the final acidity at this stage (f) within the limits required for the iron to precipitate efficiently as jarosite In actual practice, the solution resulting from the acid stage(s) which contains the greater part of the iron in ferric form (usually between 10 and 35 g/l of iron, of which only 1-2 g/l are present as $Fe^{++}$ and the remaining as $Fe^{+++}$), as well as some level of acidity (between 10 and 70 g/l) needed to keep the $Fe^{+++}$ in solution, is initially treated with zinc concentrate to transform $Fe^{+++}$ into $Fe^{++}$. In a later stage the acidity is neutralized with calcine, obtaining a neutral solution that is free of contaminating solids and contains mainly zinc sulphate and ferrous sulphate. Finally, oxidation of $Fe^{++}$ to $Fe^{+++}$ and jarosite precipitation occur simultaneously when oxygen is injected and an alkali (NaOH, $Na_2Co_3$, $NH_3$) or a salt [$Na_2SO_4$, $(NH_4)_2SO_4$] are added in the necessary amount to form jarosite based on the amount of iron that has precipitated according to the stoichiometry indicated by reactions (8) or (9) depending on whether an alkali or a salt respectively have been added. Stage (f), when the acid leaching solution generated contains more than 15 g/l of iron, will only work correctly when the iron content has been previously adjusted to the desired values by having recycled appropriately: the solution in stage (b) to stage (f) according to option 1; the solution from stage (f) to stage (e) according to option 2; the solution from stage (f) to stage (d) according to option 3; or the solution from stage (f) to the same stage (f) according to option 4

The new process described in the present document provides a satisfactory solution to all the problems mentioned previously, achieving the following objectives:
It makes possible to treat any type of zinc concentrate regardless of its iron content.

Achieves high zinc, lead, silver and gold recovery rates, above 99% for each of these metals, something that has never been achieved before by any of the existing processes, except those described in documents WO 02/46481 A1 and PCT ES 2011/070265. Copper recovery is well above 90%.

It makes possible to manage efficiently the existing energy resources because under normal conditions it is not necessary to consume steam in the jarosite precipitation stage (f), and in the event that steam was needed it would be in minimal quantities.

Iron recirculation in the process is lowered to 10-20%, a percentage significantly lower than in other processes in which iron is precipitated as jarosite, improving the operability of the leaching stages, mainly of the acid leaching stages.

The operating cost compares favorably with the jarosite process, the least expensive to date.

Existing zinc plants can easily be retrofitted to adapt to the new process and start using this new process in a short period of time.

Due to the high recovery rates of the valuable metals present in the process, and the high price of raw materials, it would be possible to treat some of the existing zinc residue storage ponds and obtain economic benefits while eliminating an environmental liability resulting from past industrial practices.

Finally, and most importantly, the process generates a clean jarosite residue free of any impurity that could prevent it from being used in other industrial processes, such as for instance cement manufacture, where the plants have sufficient capacity for treating the jarosite generated in the zinc plants. Again, this eliminates an environmental liability that has been, to date, the greatest hindrance encumbering the hydrometallurgical processes habitually used to produce electrolytic zinc. Alternatively, using the $NH_4^+$ ion for jarosite precipitation would make possible to thermically decompose the jarosite to produce ammonium sulphate and iron oxide, both products that have commercial value and are easily commercialized.

DETAILED DESCRIPTION OF SPECIFIC EMBODIMENTS

Figure 1:
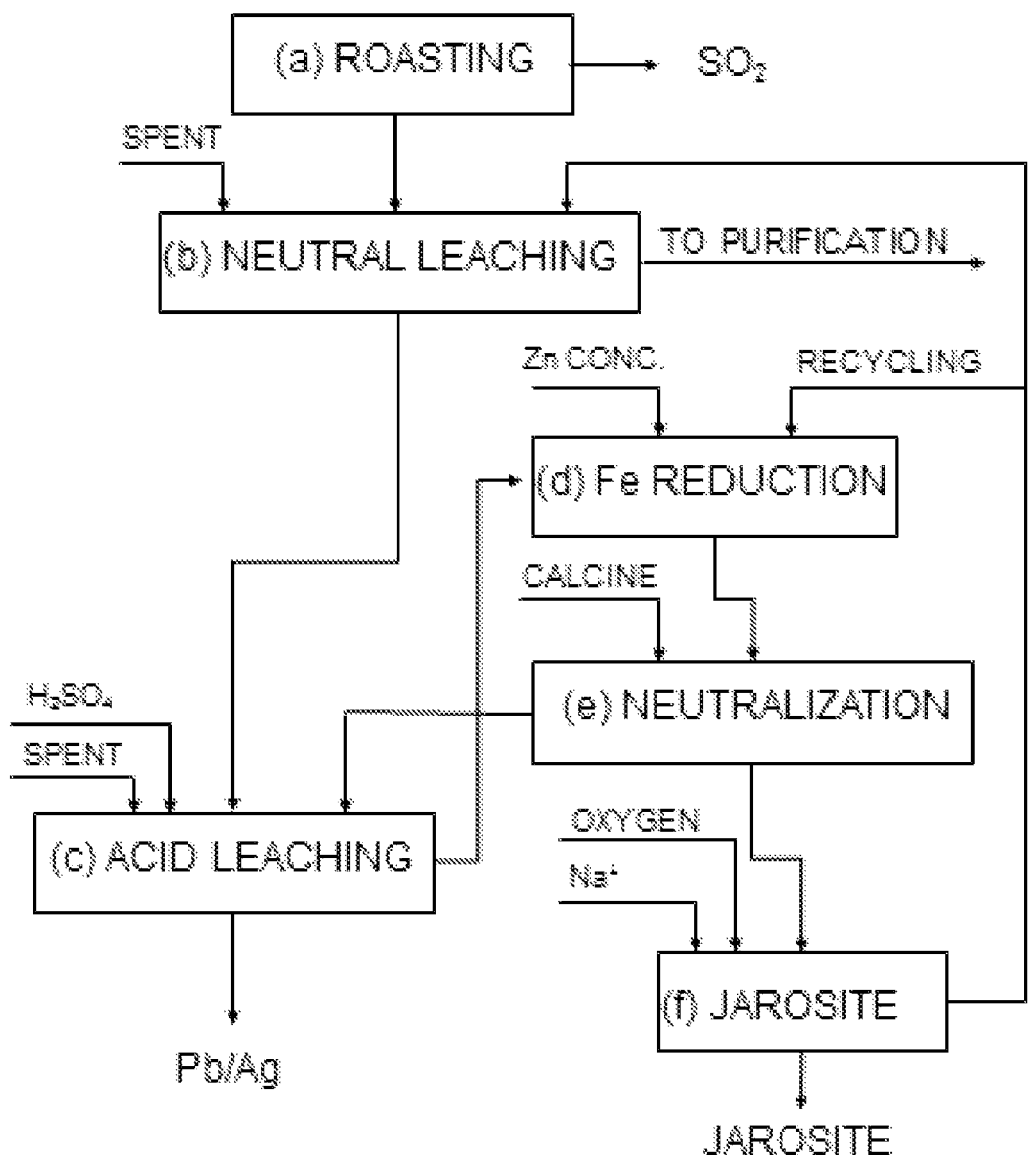
FIG. 1 shows a flow diagram of the process object of the invention, where one part of the solution resulting from the jarosite stage (f) is recycled to the reduction stage (d) at the required rate to adjust the iron content in solution to the desired values.
Figure 2:
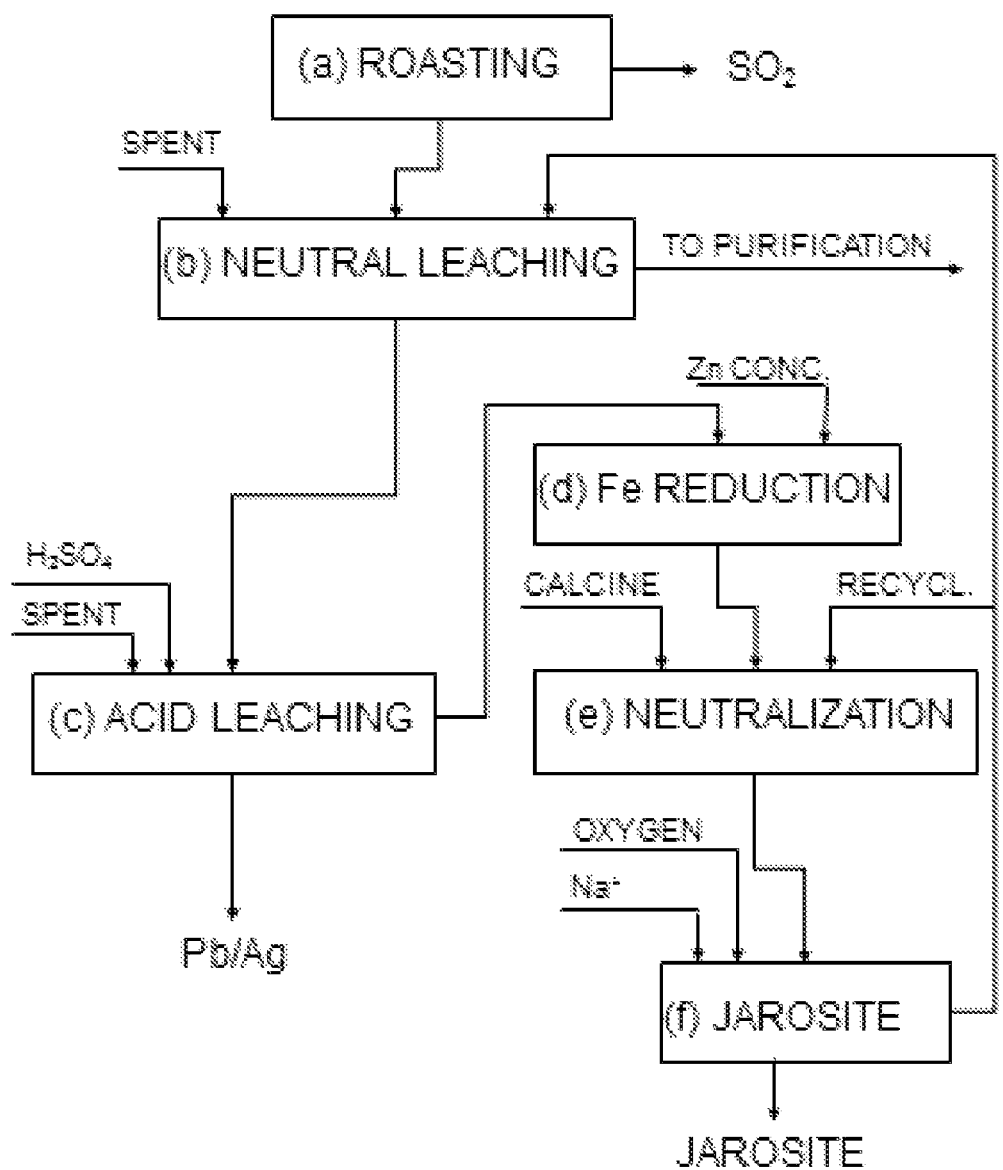
FIG. 2 shows a flow diagram of the process object of the invention, where one part of the solution resulting from the jarosite stage (f) is recycled to the neutralization stage (e) at the required rate to adjust the iron content in solution to the desired values.
Figure 3:
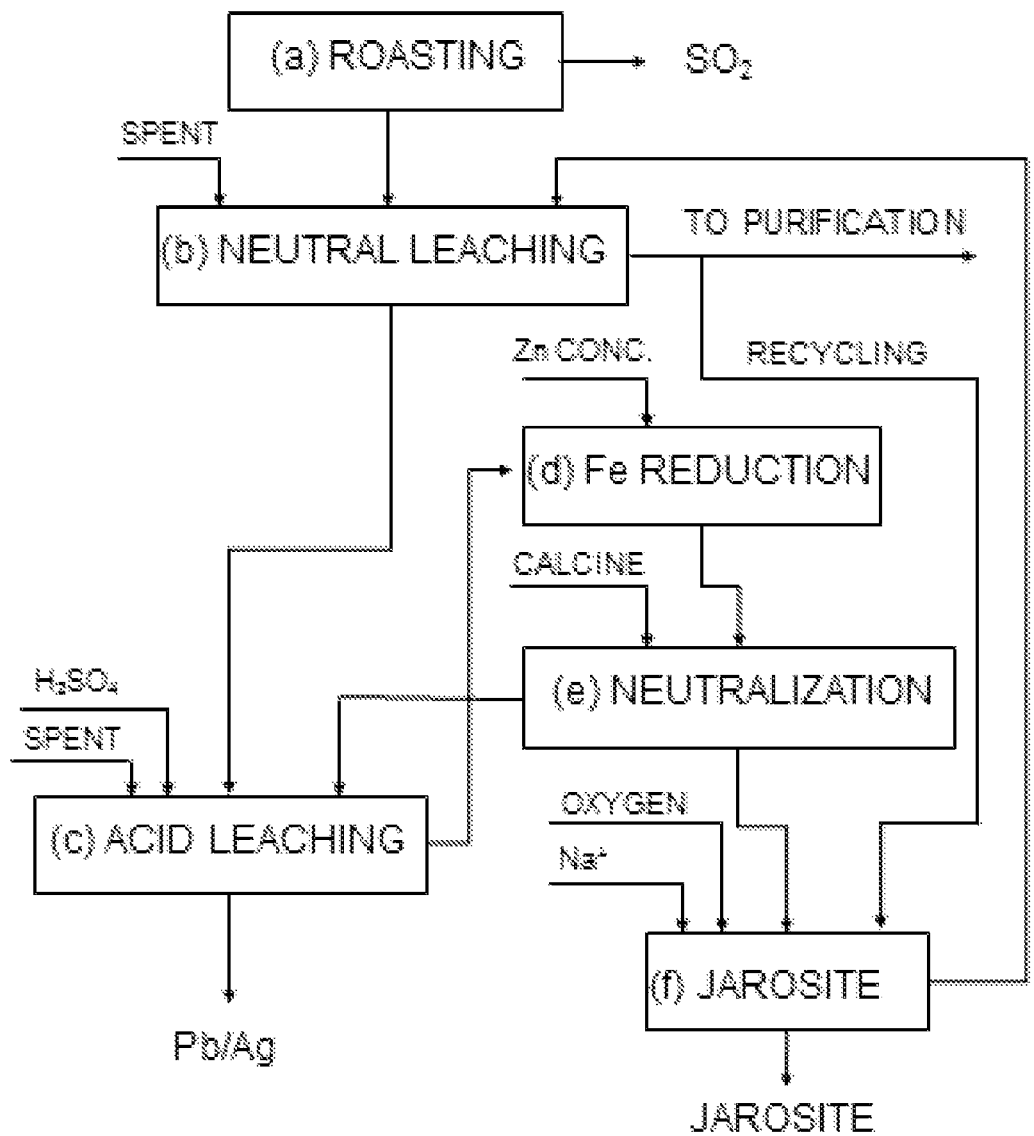
FIG. 3 shows a flow diagram of the process object of the invention, where one part of the solution resulting from the neutral leaching stage (b) is recycled to the jarosite stage (f) at the required rate to adjust the iron content in solution to the desired values.
Figure 4:
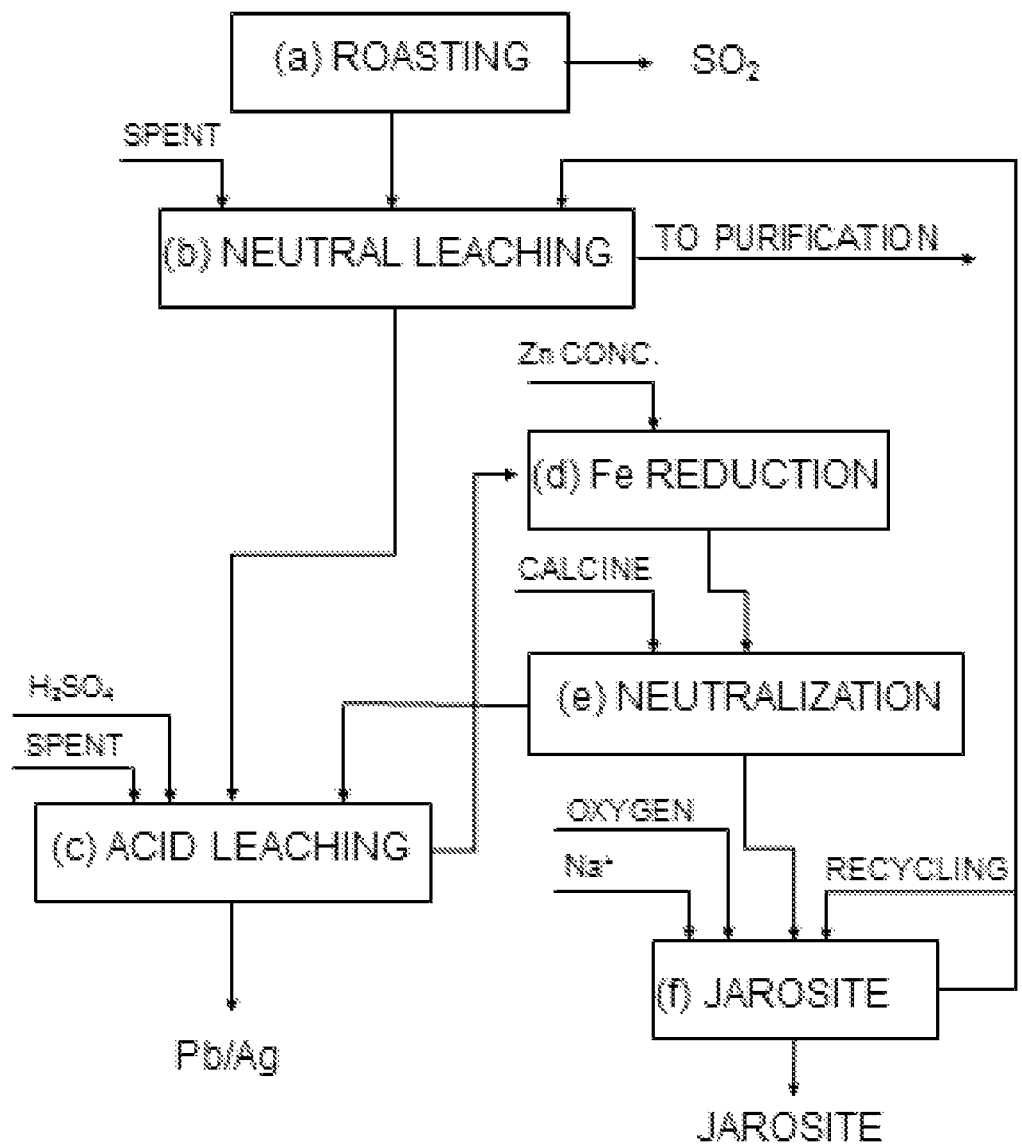
FIG. 4 shows a flow diagram of the process object of the invention, where one part of the solution resulting from the jarosite stage (f) is recycled to the same jarosite stage (f) at the required rate to adjust the iron content in solution to the desired values.

In the most general case, for concentrates with high iron content, the hydrometallurgical method of the invention comprises the following stages (see FIG. 1).

a) Roasting the sulphidic zinc concentrate to obtain roasted zinc concentrate (calcine) and sulphur dioxide that is then converted into sulphuric acid. The main reactions taking place in the roasting furnace are:

$$2ZnS+3O_2=2ZnO+2SO_2 \quad (1)$$

$$ZnO+Fe_2O_3=ZnFe_2O_4 \quad (2)$$

b) Neutral leaching, where the calcine is leached with sulphuric acid, specifically with spent electrolyte which is returned from the electrolytic cells. In this stage the zinc oxide contained in the calcine is leached with spent electrolyte, generating a zinc sulphate solution which passes to the purification stage, while the insoluble zinc ferrites ($Fe_2O_3 \cdot ZnO$) generated in the roasting stage remain in the slurry and pass to the following stage. The main reaction in this stage is:

$$ZnO+H_2SO_4=ZnSO_4+H_2O \quad (3)$$

c) Acid leaching, comprising one or several stages working in counter-current, where the zinc ferrites are leached out at atmospheric pressure with spent electrolyte and sulphuric acid under temperature conditions of between 80° C. and the boiling point, while maintaining an acidity between 10 and 140 g/l. In this stage(s) a residue is generated where all the lead, silver and gold contained in the calcine are concentrated. This residue can be used to recover these metals. The resulting solution, containing 10-70 g/l of acidity and 10-35 g/l of $Fe^{+++}$, passes to the following stage. The main reaction taking place in this stage is:

$$Fe_2O_3 \cdot ZnO+4H_2SO_4=ZnSO_4+Fe_2(SO_4)_3+4H_2O \quad (4)$$

d) Iron reduction, where the iron concentration in the solution resulting from stage (c) is adjusted to values around 15 g/l by recycling the precise amount of solid-free solution (overflow from the jarosite thickener) resulting from stage (f), while at the same time the ferric ion is reduced to ferrous ion by treating the solution resulting from the previous stage (c) and the recycling from stage (f) at atmospheric pressure with zinc concentrate at temperatures between 80° C. and the boiling point of the solution. The main reaction in this stage is:

$$Fe_2(SO_4)_3+ZnS=2FeSO_4+ZnSO_4+S° \quad (5)$$

The residue resulting from this stage (d), containing elemental sulphur formed according to reaction (5) and the unreacted excess ZnS, can be recycled to the roaster, while the solution, containing mainly $ZnSO_4$, $FeSO_4$ (around 15 g/l of $Fe^{++}$), $H_2SO_4$ and a small quantity of $Fe_2(SO_4)_3$ (between 0.5 and 1 g/l of $Fe^{+++}$), passes to the following stage.

e) Neutralization, where the acidic solution resulting from the previous stage is neutralized with calcine according to reaction (3), maintaining at the end of the reaction a pH between 3.8 and 5.2 at the actual temperature of the reaction.

The main reactions taking place in this stage are:

$$H_2SO_4+ZnO=ZnSO_4+H_2O \quad (3)$$

$$Fe_2(SO_4)_3 + 6H_2O = 2Fe(OH)_3 + 3H_2SO_4 \quad (6)$$

Most of the iron in solution, in $Fe^{++}$ form, produced in stage (d) according to reaction (5) does not precipitate and remains in solution, while the iron present as $Fe^{+++}$ precipitates as ferric hydroxide according to reaction (6).

In this manner, by neutralizing the acidity present in the solution resulting from stages (c) and (d) with calcine at this stage, the need to use calcine in stage (f) to oxidize the iron and precipitate the jarosite is eliminated.

The residue from this stage is returned to the acid leaching stage (c), unless the concentrates treated have high arsenic and/or copper content, in which case these elements are separated from this residue before it is returned to stage (c).

f) Iron oxidation and jarosite precipitation, where the oxidation of $Fe^{++}$ to $Fe^{+++}$ and the precipitation of jarosite take place simultaneously. To achieve this the solid-free neutralized solution resulting from stage (e) is treated at atmospheric pressure and at a temperature of between 80° C. and 90° C., injecting oxygen or oxygen-enriched air (in the amount necessary to facilitate the process of oxidizing $Fe^{++}$ to $Fe^{+++}$) and adding an alkali (NaOH, $Na_2CO_3$ or $NH_3$) in the proportion required to enable jarosite formation according to the stoichiometry of reaction (8). Under these working conditions the final acidity of the solution has a value of around 6 g/l, and in this manner both the oxidation of Fe++ to Fe+++ and the efficient precipitation of $Fe^{+++}$ as jarosite, are achieved simultaneously according to the following reactions:

$$4FeSO_4 + O_2 + 2H_2SO_4 = 2Fe_2(SO_4)_3 + 2H_2O \quad (7)$$

$$3Fe_2(SO_4)_3 + 2MeOH + 10H_2O = 2[Fe_3(SO_4)_2(OH)_6]Me + 5H_2SO_4 \quad (8)$$

Where Me can be $Na^+$ or $NH_4^+$.

According to these reactions, for every 1 g/l of $Fe^{+++}$ precipitated as jarosite 1.46 g/l of sulphuric acid are generated, of which 0.88 g/l are consumed in turn for every g/l of $Fe^{++}$ that is oxidized to $Fe^{+++}$. Therefore, the resulting balance is that for every g/l of $Fe^{++}$ oxidized to $Fe^{+++}$ and precipitated as jarosite, the acidity of the solution increases by 0.58 g/l. According to this, a solution containing 15 g/l of $Fe^{++}$ at the beginning of this stage and 1.5 g/l of $Fe^{++}$ and 1 g/l de $Fe^{+++}$ at the end, would have a maximum final acidity of 6 g/l at the end of this stage, which would be very favorable conditions to achieve efficient jarosite precipitation. The starting solution could be diluted even more to further reduce the $Fe^{++}$ content and thus obtain a final solution with pH 1.5, conditions that would cause less iron to be recycled during the process.

If, instead of using an alkali such as those already mentioned, a sodium or ammonium salt ($Na_2SO_4$ or $(NH_4)_2SO_4$) is used to contribute the cation needed to form jarosite, then reaction (8) would be replaced by the following:

$$3Fe_2(SO_4)_3 + Me_2SO_4 + 12H_2O = 2[Fe_3(SO_4)_2(OH)_6]Me + 6H_2SO_4 \quad (9)$$

Where Me can be $Na^+$ or $NH_4^+$ indistinctly.

In this case, according to reaction (9), for every g/l of Fe 1.76 g/l of sulphuric acid are generated, while according to reaction (7) 0.88 g/l are consumed for every g/l of $Fe^{++}$ that is oxidized to $Fe^{+++}$. Therefore, the resulting balance is that for every g/l of $Fe^{++}$ oxidized to $Fe^{+++}$ and precipitated as jarosite, the acidity of the solution is increased by 0.88 g/l. According to this, a solution containing 15 g/l of $Fe^{++}$ at the beginning of this stage as well as 1.5 g/l de $Fe^{++}$ and 1.5 g/l de $Fe^{+++}$ at the end of this stage, would have a final acidity of 10 g/l, these being conditions also favorable for attaining efficient jarosite precipitation. In this manner the iron recycling through the neutral and the acid leaching stages is reduced to 10-20%.

It should be noted that using this process, as it has been described, it is possible to generate clean jarosite. The maximum content of impurities in this jarosite is:

Zn≤0.25%
Pb≤0.05%
As≤0.10%
Cu≤0.10%

The present invention does not require any external neutralizing agent which might contain contaminating elements (such as would be the case with calcine). It allows the precipitation process to take place starting with a clean solution, free of solids which could contaminate the final jarosite residue. Also, by not having to use calcine in this stage, the loss of valuable metals (Zn, Pb, Ag and Au) is significantly reduced as their recovery rate is increased up to the levels previously mentioned: above 99% in the case of zinc and 100% for lead, silver and gold for the whole of the leaching stages.

Given that both the oxygen and the added alkali (in this case NaOH, though it could also be $Na_2CO_3$ or $NH_3$) are not polluting products, but are instead components that are incorporated into the jarosite, it is therefore evident that the final jarosite residue is a clean product and, as such, can be used in other industrial processes, such as for example in cement manufacture. This makes the present invention different from existing jarosite, goethite, paragoethite or direct leaching processes, all of which generate Fe residues contaminated with other metals (mainly zinc and lead and occasionally copper and/or arsenic) which prevents them from being later used in other processes and requires they are stored in safe conditions, a practice that is increasingly made more difficult as the permits required for this activity are either hard or impossible to obtain.

Furthermore, by eliminating calcine from the jarosite precipitation stage, the recovery rate of zinc, lead, silver and gold during the leaching stages increases to above 99%.

The jarosite residue that is obtained constitutes a clean product that can be separated and reutilized for other industrial processes. The solution resulting from this stage in which most of the iron has been precipitated is returned to the neutral leaching stage (b).

Stages (a), (b) and (c) are common to the large majority of industrial processes (jarosite, goethite, paragoethite). Stages (d) and (e) are used in the goethite process but not in the jarosite process. Stage (f) is a novel stage. Its innovation resides in that the incoming solution in this stage is a neutral zinc sulphate and ferrous sulphate solution free of solids that could contaminate the final jarosite precipitate obtained, and it has an iron content adjusted to the values desired to obtain a final acidity more conducive for iron to precipitate efficiently as jarosite. A situation that is made possible by recirculating the solution in this same stage (the solid free overflow from the jarosite thickener going into the reduction stage (d)). It is also based on the fact that the reagents that are added at this stage (oxygen or oxygen-enriched air and an alkali or alkaline salt) are only those strictly necessary to enable reactions (7) and (8).

It should be noted that stage (f) could not take place in this manner without stages (d) and (e). During the acid leaching stage (c), most of the iron that has dissolved as a consequence of leaching the zinc ferrites is in $Fe^{+++}$ form. In order to maintain this ferric iron in solution certain level of acidity must be maintained in the solution. In industrial processes this acidity normally oscillates between 10 and 70 g/l. Later, during stage (d) $Fe^{+++}$ is reduced to $Fe^{++}$ by adding zinc concentrate so in the next stage (e) the acidity present in the solution at the end of stage (d) can be neutralized. In this manner, by neutralizing residual acidity in stage (e), and by the acid being consumed in stage (f) as a result of $Fe^{++}$ oxidizing into $Fe^{+++}$ according to reaction (7) so it can be precipitated as jarosite according to reactions (8) or (9) the entire process works harmoniously, producing two results: very good metal recovery rates and a clean iron residue.

This procedure is different from the one described in WO 02/46481 A1. Indeed in the process described in said document, jarosite precipitation takes place in variable acidity conditions that depend on the iron content of the solution resulting from the acid leaching stage. For this iron precipitation to take place with minimum efficiency it is necessary to recycle a significant volume of solids obtained from the jarosite thickener underflow through the same jarosite stage, while at the same time the working temperature has to be very close the boiling point of the solution. However, in the procedure described in the present document the jarosite solids are not recycled. What is recycled through the reduction stage (d) is the solid free solution obtained from the jarosite thickener. Also, the purpose of recycling is completely different from that described in document WO 02/46481 A1 (done to cause jarosite formation). In the procedure described in the present document the purpose of recycling is to adjust the iron content of the solution to later be able to precipitate the jarosite without any type of seeding, within a low acidity range that will allow us to obtain the desired results as sufficiently stated in this document.

The present procedure is also different from that described in PCT ES 2011/070265, where although the process works well with the iron contents found in the solution resulting from the acid leaching stage (up to 20 g/l) without it requiring additional neutralizing agents, for iron contents above 20 g/l the process requires other non-contaminating neutralizing agents such as BZS, that allows for a maximum iron content of 25 g/l of iron by considerably increasing iron recycling in the neutral and acid leaching stages. On the contrary, the procedure described in the present document does not pose any limits to the iron contents of the solution resulting from acid leaching stage, because using the solid free jarosite solution recycle on the solution resulting from the acid leaching stage, as previously mentioned, it is possible to always work during the jarosite precipitation stage within an optimum acidity range, minimizing iron recycling through the neutral and acid leaching stages.

It is true that the present invention requires, in addition to consuming oxygen or oxygen-enriched air—a step not needed in the jarosite process—, a larger investment in equipment compared to that required for traditional jarosite processes, but merely for the greater recovery of metals that is obtained the increased costs are justified. In terms of increased investment cost, for a plant operating with the jarosite or goethite process, the return of the investment takes place in less than a year, making a project of this kind very attractive from the economic point of view.

In terms of direct leaching processes, they either precipitate the iron in the presence of the residue resulting from the leaching of concentrates (obtaining a single residue without any commercial value where the jarosite is mixed with lead, silver, unleached zinc ferrites and elemental sulphur), or they precipitate the iron at atmospheric pressure in a separate stage. Nevertheless, in all cases calcine is added as neutralizing agent which contaminates the final iron residue as described in document U.S. Pat. No. 6,475,450, or they use autoclaves to form a precipitate, generally hematite, which makes the process very costly and uncompetitive, as in U.S. Pat. No. 5,120,353. Therefore the present invention differs from direct leaching processes in that: a) it uses a solution free of solids which could otherwise contaminate the final jarosite residue; b) it does not use calcine nor any other neutralizing agent other than the oxygen-enriched air needed for oxidizing $Fe^{++}$ into $Fe^{+++}$ or the alkali needed for jarosite precipitation; and c) it does not require autoclaves, given that all the stages of the process take place at atmospheric pressure.

To recover zinc residues containing other valuable metals resulting from the previous industrial activities, all that is required is to set up a stage (c') parallel to the existing stage (c) in which said residues would be treated with spent electrolyte and sulphuric acid to dissolve the iron, zinc and copper while other valuable metals such as lead, silver and gold remain insoluble. The residue of this stage is joined to that of existing stage (c) while the solution will go to stage (d).

What is claimed is:

1. A hydrometallurgical method for recovering zinc in sulphuric media from sulphidic zinc concentrates with an iron content of at least 5% by weight, wherein a zinc concentrate is subjected to steps (a) to (f), all of which except step (a), take place at atmospheric pressure:
   (a) roasting of at least part of the zinc concentrate to obtain calcine;
   (b) neutral leaching where zinc oxide is dissolved;
   (c) acid leaching where zinc ferrites are leached by means of sulphuric acid in a form of spent electrolyte and concentrated sulphuric acid, generating a resulting solution rich in zinc and iron that contains between 10 and 35 g/l of $Fe^{+++}$ and between 10 and 70 g/l of sulphuric acidity, and a residue wherein lead, silver and gold contained in the zinc concentrates are concentrated;
   (d) reducing the $Fe^{+++}$ contained in the solution resulting from step (c) to $Fe^{++}$ by adding zinc concentrate and diluting it with a zinc sulphate solution to obtain a solution in which $Fe^{+++}$ has been reduced to $Fe^{++}$;
   (e) neutralizing the acidity of the solution resulting from step (d) with calcine, generating a solution with a pH between 3.8 and 5.2 and a $Fe^{++}$ concentration;
   (f) oxidizing iron and precipitating jarosite without adding any jarosite seed from the solution resulting from step (e), free of contaminating solids, by injecting oxygen or oxygen-enriched air and adding an alkali or a $Na^+$ or $NH_4^+$ salt, resulting in a final solution having an acidity between pH 1.5 and pH 0.95, and recycling a portion of the final solution obtained in step (f) to step (d) as zinc sulphate solution for diluting in step (d);
   wherein in steps (d) and (e) the $Fe^{++}$ concentration is adjusted such that working during step (f) with a final acidity between pH 1.5 and pH 0.95.

2. The method described in claim 1, characterized in that the oxygen or oxygen-enriched air is injected during step (f) in a quantity required to oxidize the $Fe^{++}$ present in the solution to $Fe^{+++}$ until the content of $Fe^{++}$ in the solution has been lowered to below 2 g/l.

3. The method described in claim 1, characterized in that a temperature during step (f) is kept at between 80 and 90 degrees centigrade.

4. A hydrometallurgical method for recovering zinc in sulphuric media from sulphidic zinc concentrates with an iron content of at least 5% by weight, wherein a zinc concentrate is subjected to steps (a) to (f), all of which except step (a), take place at atmospheric pressure:
   (a) roasting of at least part of the zinc concentrate to obtain calcine;
   (b) neutral leaching where zinc oxide is dissolved;
   (c) acid leaching where zinc ferrites are leached by means of sulphuric acid in a form of spent electrolyte and concentrated sulphuric acid, generating a resulting solution rich in zinc and iron that contains between 10 and 35 g/l of $Fe^{+++}$ and between 10 and 70 g/l of sulphuric acidity, and a residue wherein lead, silver and gold contained in the zinc concentrates are concentrated;
   (d) reducing the $Fe^{+++}$ contained in the solution resulting from step (c) to $Fe^{++}$ by adding zinc concentrate to obtain a solution in which $Fe^{+++}$ has been reduced to $Fe^{++}$;
   (e) neutralizing the acidity of the solution resulting from step (d) with calcine, and diluting it with a zinc sulphate solution to obtain a solution with a pH between 3.8 and 5.2 and a $Fe^{++}$ concentration;
   (f) oxidizing iron and precipitating jarosite without adding any jarosite seed from the solution resulting from step (e), free of contaminating solids, by injecting oxygen or oxygen-enriched air and adding an alkali or a $Na^+$ or $NH_4^+$ salt, resulting in a final solution having an acidity between pH 1.5 and pH 0.95, and recycling a portion of the final solution obtained in step (f) to step (e) as zinc sulphate solution used for diluting in step (e);
   wherein in step (e) the $Fe^{++}$ concentration is adjusted such that working during step (f) with a final acidity between pH 1.5 and pH 0.95.

5. The method described in claim 4, characterized in that the oxygen or oxygen-enriched air is injected during step (f) in a quantity required to oxidize the $Fe^{++}$ present in the solution to $Fe^{+++}$ until the content of $Fe^{++}$ in the solution has been lowered to below 2 g/l.

6. The method described in claim 4, characterized in that a temperature during step (f) is kept at between 80 and 90 degrees centigrade.

7. A hydrometallurgical method for recovering zinc in sulphuric media from sulphidic zinc concentrates with an iron content of at least 5% by weight, wherein a zinc concentrate is subjected to steps (a) to (f), all of which except step (a), take place at atmospheric pressure:
   (a) roasting of at least part of the zinc concentrate to obtain calcine;
   (b) neutral leaching where zinc oxide is dissolved;
   (c) acid leaching where zinc ferrites are leached by means of sulphuric acid in a form of spent electrolyte and concentrated sulphuric acid, generating a resulting solution rich in zinc and iron that contains between 10 and 35 g/l of $Fe^{+++}$ and between 10 and 70 g/l of sulphuric acidity, and a residue wherein lead, silver and gold contained in the zinc concentrates are concentrated;
   (d) reducing the $Fe^{+++}$ contained in the solution resulting from step (c) to $Fe^{++}$ by adding zinc concentrate to obtain a solution in which $Fe^{+++}$ has been reduced to $Fe^{++}$;
   (e) neutralizing the acidity of the solution resulting from step (d) with calcine to obtain a final solution with a pH between 3.8 and 5.2;
   (f) oxidizing iron and precipitating jarosite without adding any jarosite seed from the solution resulting from step (e), free of polluting solids, by injecting oxygen or oxygen-enriched air and adding an alkali or a $Na^+$ or $NH_4^+$ salt, and diluting it with zinc sulphate resulting from step (b) to obtain a final solution with an acidity between pH 1.5 and pH 0.95.

8. The method described in claim 7, characterized in that the oxygen or oxygen-enriched air is injected during step (f) in a quantity required to oxidize the $Fe^{++}$ present in the solution to $Fe^{+++}$ until the content of $Fe^{++}$ in the solution has been lowered to below 2 g/l.

9. The method described in claim 7, characterized in that a temperature during step (f) is kept at between 80 and 90 degrees centigrade.

10. A hydrometallurgical method for recovering zinc in sulphuric media from sulphidic zinc concentrates with an iron content of at least 5% by weight, wherein a zinc concentrate is subjected to steps, all of which except step (a), take place at atmospheric pressure:
    (a) roasting of at least part of the zinc concentrate to obtain calcine;
    (b) neutral leaching where zinc oxide is dissolved;
    (c) acid leaching where zinc ferrites are leached by means of sulphuric acid in a form of spent electrolyte and concentrated sulphuric acid, generating a resulting solution rich in zinc and iron that contains between 10 and 35 g/l of $Fe^{+++}$ and between 10 and 70 g/l of sulphuric acidity, and a residue wherein lead, silver and gold contained in the zinc concentrates are concentrated;
    (d) reducing the $Fe^{+++}$ contained in the solution resulting from step (c) to $Fe^{++}$ by adding zinc concentrate to obtain a solution in which $Fe^{+++}$ has been reduced to $Fe^{++}$;
    (e) neutralizing the acidity of the solution resulting from step (d) with calcine to obtain a solution with a pH between 3.8 and 5.2;
    (f) oxidizing iron and precipitating jarosite without adding any jarosite seed from the solution resulting from step (e), free of contaminating solids, by injecting oxygen or oxygen-enriched air and adding an alkali or a $Na^+$ or $NH_4^+$ salt, and diluting it with zinc sulphate resulting from the same step (f) to obtain a final solution with an acidity between pH 1.5 and pH 0.95.

11. The method described in claim 10, characterized in that the oxygen or oxygen-enriched air is injected during step (f) in a quantity required to oxidize the $Fe^{++}$ present in the solution to $Fe^{+++}$ until the content of $Fe^{++}$ in the solution has been lowered to below 2 g/l.

12. The method described in claim 10, characterized in that a temperature during step (f) is kept at between 80 and 90 degrees centigrade.

* * * * *